(12) United States Patent
Hashiba (10) Patent No.: US 7,128,041 B2
(45) Date of Patent: Oct. 31, 2006

(54) RECOIL STARTER

(75) Inventor: Hideki Hashiba, Tokyo (JP)

(73) Assignee: Starting Industrial Co., Ltd., Tokyo (JP)

( * ) Notice: Subject to any disclaimer, the term of this patent is extended or adjusted under 35 U.S.C. 154(b) by 0 days.

(21) Appl. No.: 11/249,277

(22) Filed: Oct. 14, 2005

(65) Prior Publication Data

US 2006/0081209 A1 Apr. 20, 2006

(30) Foreign Application Priority Data

Oct. 18, 2004 (JP) .......................... P2004-303518

(51) Int. Cl.
*F02N 3/02* (2006.01)
*F02N 5/02* (2006.01)

(52) U.S. Cl. .............................. 123/185.14; 123/185.3; 185/41 A (58) Field of Classification Search ..................... None
See application file for complete search history.

(56) References Cited

U.S. PATENT DOCUMENTS 4,848,288 A  7/1989 Murase et al.
6,508,220 B1  1/2003 Akaike et al.
2004/0084004 A1 *  5/2004 Tsunoda et al. ......... 123/185.3
2004/0177823 A1  9/2004 Saito

FOREIGN PATENT DOCUMENTS

EP        1 253 315     10/2002
EP        1 384 881     1/2004
JP        2004-197731   7/2004

* cited by examiner

*Primary Examiner*—Andrew M. Dolinar
(74) *Attorney, Agent, or Firm*—Nixon & Vanderhye P.C.

(57) ABSTRACT

A recoil starter in which a side face of a rope reel is formed with a ring-like recess portion for containing a damping force storing member, a boss portion of a cam is contained at inside of the ring-like recess portion and the damping force storing member is contained between an inner peripheral face of the ring-like recess portion and an outer peripheral face of the boss portion of the cam, an inner side of the boss portion of the cam is formed with a ratchet mechanism for engaging and disengaging the cam to and from the rope reel, when the rope reel is rotated by traction of the recoil rope, the both members are disengaged from each other and when the rope reel is rotated in a direction of reeling back the recoil rope, the both members are engaged with each other.

3 Claims, 7 Drawing Sheets

RECOIL STARTER

BACKGROUND OF THE INVENTION

1. Field of the Invention

The present invention relates to a recoil starter for starting an engine by rotating a rotating member connected to a crankshaft of the engine by rotating a rope reel by operating to pull a recoil rope and transmitting rotation of the rope reel to a cam by way of the cam.

2. Description of the Related Art

There is known a recoil starter for starting an engine by rotating a crankshaft of the engine by rotating a rope reel by traction of a recoil rope wound around the rope reel and transmitting rotation of a cam rotatably connected to the rope reel to a rotating member of a flywheel magnet, a drive pulley or the like attached to the crankshaft of the engine by way of a crutch mechanism of a centrifugal clutch or the like by way of the rotating member, in which a damping force storing member is interposed between the rope reel and the cam, impact by a variation in a rapid load on a side of the engine is damped by the damping force storing member such that the impact is not transmitted to a side of the rope reel, a rotational force of the rope reel is stored in the damping force storing member and the engine is facilitated to start by releasing the rotational force stored to the damping force storing member to the side of the cam.

According to the recoil starter having the damping force storing member arranged between the rope reel and the cam as described above, the rope reel rotated in an engine starting direction by traction of the recoil rope and the cam for transmitting the rotational force to the rotating member connected to the crankshaft of the engine by way of the clutch mechanism are rotatably supported respectively by a support shaft formed in a case, a ring-like recess portion is formed at a side face of the rope reel and a boss portion of the cam is contained in the ring-like recess portion, the rope reel and the cam are rotatably connected by connecting both ends of a mainspring constituting the damping force storing member contained in the ring-like recess portion to between an inner peripheral face of the ring-like recess portion of the rope reel and an outer peripheral face of the boss portion of the cam, further, a ratchet mechanism is formed at a side face of the rope reel proximate to an outer periphery thereof, the ratchet mechanism is operated by being engaged with an inner peripheral face of the case containing the rope reel and the like, when the rope reel is rotated in the engine starting direction, the ratchet mechanism is separated from an engaging member formed at an outer periphery of the cam, when the rope reel is rotated in a direction reverse to the engine starting direction by the rotational force stored to the recoil mainspring, the ratchet mechanism is engaged with the engaging member and the cam is rotated in the reverse direction integrally with the rope reel, as disclosed in JP-A-2004-197731.

According to the ratchet mechanism for interrupting rotation between the rope reel and the cam of the background art, a ratchet member is pivotably supported by a side face portion proximate to the outer periphery of the rope reel rotatably held by the reel support shaft formed in the case, when the rope reel is rotated in the case, the ratchet member is operated to pivot by engaging the ratchet member with the inner peripheral face of the case, thereby, the ratchet member is engaged with and separated from the engaging member formed at the outer periphery of the cam and therefore, it is necessary to form a peripheral wall portion in a cylindrical shape engaged with the ratchet mechanism at the inner peripheral face of the case opposed to the outer periphery of the rope reel and therefore, outer shapes of the rope reel and the case are large and part prices are made to be expensive to constitute a factor of hampering small-sized and light-weighted formation and a reduction in cost of the recoil starter.

SUMMARY OF THE INVENTION

It is a problem of the invention to resolve the problem of the background art and provide a recoil starter facilitating to start an engine by providing a damping force storing member, capable of achieving small-sized and light-weighted formation and a reduction in cost.

In order to resolve the above-described problem, a recoil starter according to a first aspect of the invention includes a rope reel rotatably held by a reel support shaft formed in a case and rotated in an engine starting direction by traction of a recoil rope one end which is extracted to outside of the case, a recoil mainspring for urging to rotate the rope reel in a direction reverse to the engine starting direction, a cam for transmitting a rotational force to a rotating member attached to a side of an engine by way of a clutch mechanism, and a damping force storing member interposed between the rope reel and the cam for storing the rotational force of the rope reel and rotating the cam by the stored rotational force when the rope reel is rotated in the engine starting direction for transmitting rotation of the cam rotated by the rotational force stored to the damping force storing member to the rotating member by way of the clutch mechanism, wherein a ring-like recess portion for containing the damping force storing member is formed at a side face of the rope reel, a boss portion of the cam is contained in the ring-like recess portion and the damping force storing member is contained between an inner peripheral face of the ring-like recess portion and an outer peripheral face of the boss portion of the cam, further, an inner side of the boss portion of the cam is formed with a ratchet mechanism for engaging and disengaging the cam to and from the rope reel, when the rope reel is rotated by traction of the recoil rope, the both members are disengaged from each other and when the rope reel is rotated in a direction of reeling back the recoil rope, the both members are engaged to each other by the ratchet mechanism.

In a second aspect of the invention, the clutch mechanism formed between the rotating member and the cam is provided with a clutch claw engageable with engaging teeth formed at the rotating member to be rotatably supported by the cam, and by engaging the clutch claw with a guide groove formed at a guide plate provided with a predetermined rotational resistance, the clutch claw is constituted to operate to engage and disengage to and from the engaging teeth by operating to rotate the cam.

In a third aspect of the invention, the clutch mechanism formed between the rotating member and the cam is constituted by a clutch member formed at the rotating member operated to be separated from a cam claw formed at an outer peripheral face of the cam by a centrifugal force of the rotating member.

According to the first aspect of the invention, the recoil starter is constituted by the rope reel rotatably held by the reel support shaft formed in the case and rotated in the engine starting direction by traction of the recoil rope extracted to outside of the case the one end of which is extracted to outside of the case, the recoil mainspring for urging to rotate the rope reel in the direction reverse to the engine starting direction, the cam for transmitting the rotational force to the rotating member attached to the side of the engine by way of the clutch mechanism, and the damping force storing member interposed between the rope reel and the cam for storing the rotational force of the rope reel when the rope reel is rotated in the engine starting direction and rotating the cam by the stored rotational force for transmitting rotation of the cam rotated by the rotational force stored to the damping force storing member to the rotating member by way of the clutch mechanism and therefore, when the recoil rope is pulled by a comparatively long length, the engine can be started by absorbing impact by damping force storing operation. Further, also by pulling the recoil rope by a plurality of times by a comparatively short length, the engine can be started by absorbing impact by the damping force storing operation. The length of extracting the recoil rope and the position of exerting the force can be adjusted in this way and therefore, the engine can easily be started by reducing impact in accordance with the damping force operation.

Further, according to the first aspect of the invention, the side face of the rope reel is formed with the ring-like recess portion for containing the damping force storing member, the boss portion of the cam is contained in the ring-like recess portion and the damping force storing member is contained between the inner peripheral face of the ring-like recess portion and the outer peripheral face of the boss portion of the cam, further, the inner side of the boss portion of the cam is formed with the ratchet mechanism for engaging and disengaging the cam to and from the rope reel, when the rope reel is rotated by traction of the recoil rope, the both members are disengaged from each other and when the rope reel is rotated in the direction of reeling back the recoil rope, the both members are engaged with each other by the ratchet mechanism and therefore, it is not necessary to form a ratchet mechanism on an outer peripheral side of the rope reel as in the background art and therefore, outer shapes of the rope reel and the case can be formed to be small and small-sized and light-weighted formation of the recoil starter can be achieved.

Further, according to the second aspect of the invention, the clutch mechanism formed between the rotating member and the cam is provided with the clutch claw engageable with the engaging teeth formed at the rotating member to be supported rotatably, by engaging the clutch claw with the guide groove formed at the guide plate provided with the predetermined rotational resistance, by operating to rotate the cam, the clutch claw is operated to engage and disengage to and from the engaging teeth and therefore, when the cam is rotated in the direction reverse to the engine starting direction, in accordance with rotation of the cam, the clutch claw is pivoted by receiving the rotational resistance by the guide plate and is engaged and disengaged to and from the engaging teeth formed at the rotating member and therefore, when the cam is rotated in the engine starting direction, rotation is firmly transmitted and after starting the engine, rotation between the both members is disconnected and therefore, rotation on the side of the engine is not transmitted to the side of the cam and the rope reel. Further, when the cam is rotated in the reverse direction, sound of impacting the clutch claw and the engaging teeth is not emitted and the recoil starter in which operating sound is quiet in starting the engine can be provided.

Further, according to the third aspect of the invention, the clutch mechanism formed between the rotating member and the cam is constituted by the clutch member formed at the rotating member operated to separate from the cam claw formed at the outer peripheral face of the cam by the centrifugal force of the rotating member and therefore, when the engine is started and the crankshaft is rotated, by rotating a drive pulley holding a centrifugal ratchet is separated from the cam by the centrifugal force and therefore, rotation on the side of the engine is not transmitted to the side of the cam and the rope reel.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

The invention realizes the object of providing a recoil starter facilitating to start an engine by providing a damping force storing member, capable of achieving small-sized and light-weighted formation and capable of achieving a reduction in cost by forming a ring-like recess portion containing a damping force storing member at a side face of a rope reel, containing a boss portion of a cam in the ring-like recess portion and containing the damping force storing member between an inner peripheral face of the ring-like recess portion and an outer peripheral face of the boss portion of the cam, further, forming a ratchet mechanism for engaging and separating the cam and the rope reel on an inner side of the boss portion of the cam, separating the both members when the rope reel is rotated by traction of a recoil rope and engaging the both members when the rope reel rotates the recoil rope in a reel back direction by the ratchet mechanism, and further specific embodiments will be explained as follows.

Embodiment 1

Figure 1:
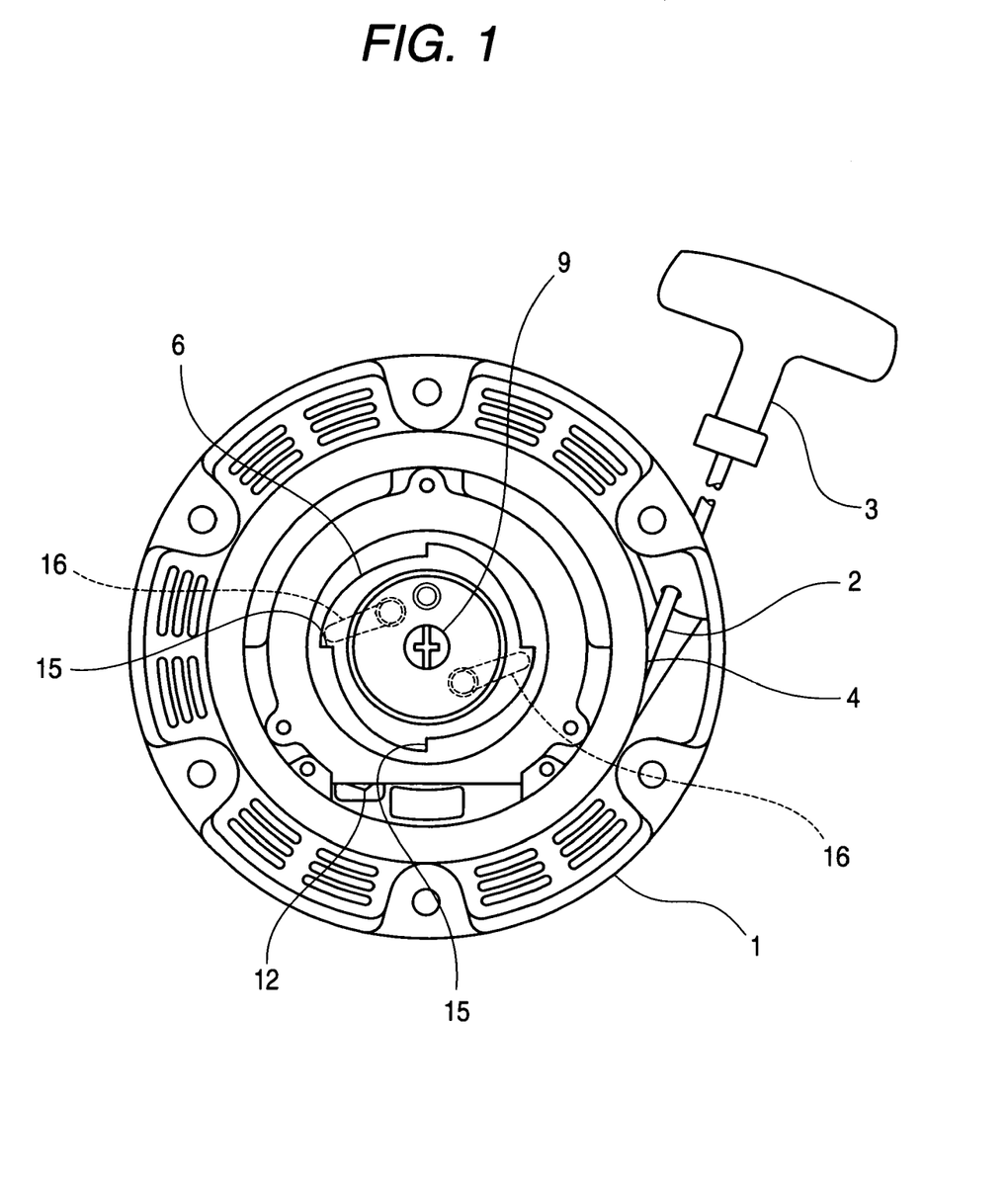
FIG. 1 is a front view of a recoil starter according to an embodiment of the invention.

As shown by FIG. 1, a recoil starter according to the embodiment of the invention is provided with a case 1 formed to be attached to one side face of an engine which an end portion of a crankshaft faces, and inside of the case 1 is contained with a main mechanism constituting the recoil starter of a rope reel 4 or the like wound with a recoil rope 2 at an outer periphery thereof. One end side of the recoil rope 2 wound around the rope reel 4 rotatably mounted in the case 1 is extracted to an outer side of the case 1 and the end portion is attached with a handle 3 for operating to pull the recoil rope 2. When the recoil rope 2 is extracted from the rope reel 4 by traction of the recoil rope 2 by way of the handle 3, the rope reel 4 is rotated, rotation of the rope reel 4 is transmitted to a cam 5 (illustrated in FIG. 2 and following views), and a rotating member 6 attached to the crankshaft of the engine is rotated by way of the cam 5.

Figure 2:
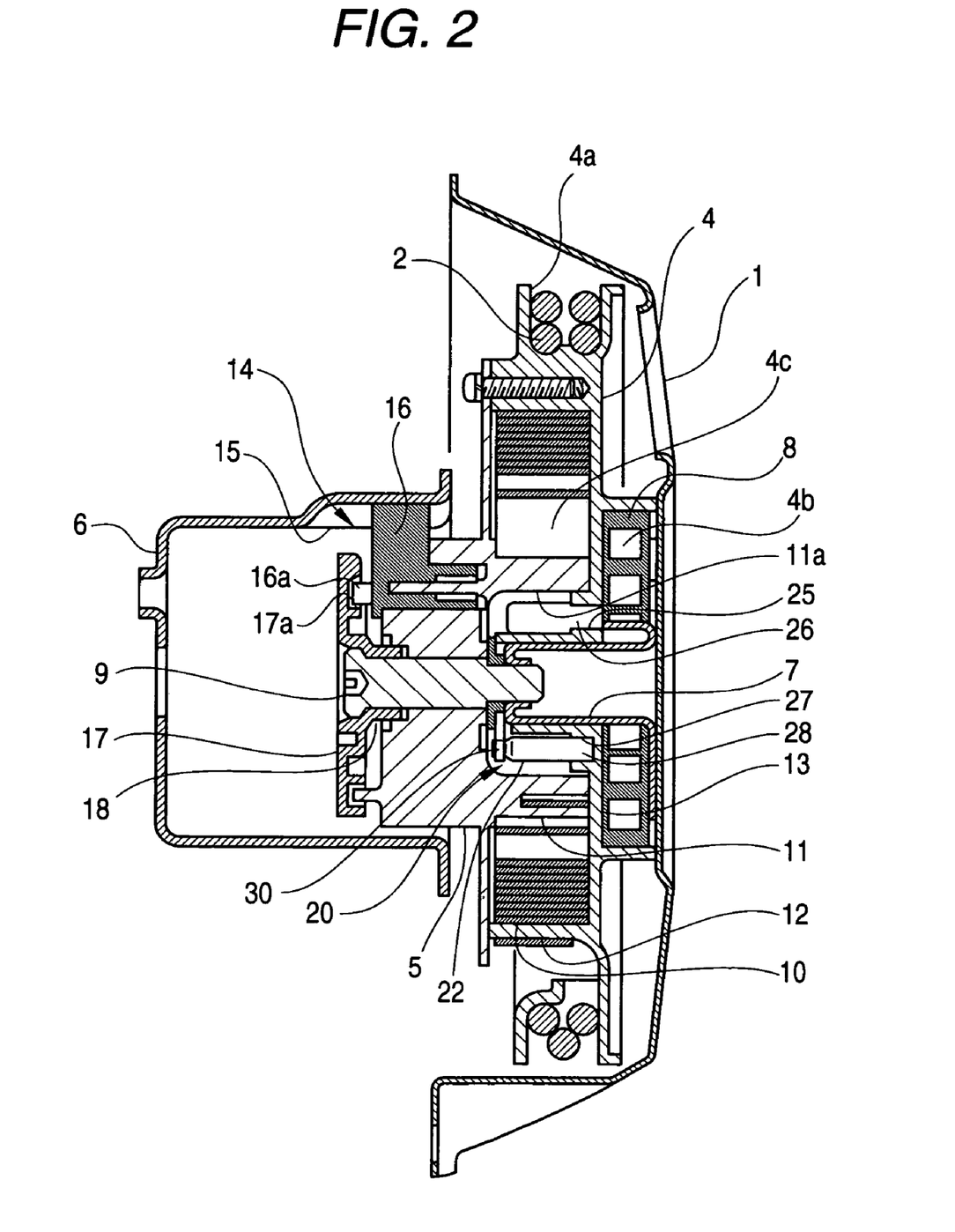
FIG. 2 is a vertical side sectional view of the recoil starter the same as that of FIG. 1.

As shown by FIG. 2, an inner side face of the case 1 is formed with a reel support shaft 7 projected to an inner side of the case 1 to be opposed to the crankshaft of the engine when the case 1 is attached to the engine, and the rope reel 4 is rotatably mounted to the reel support shaft 7. The recoil rope 2 the one end of which is extracted to outside of the case 1 is wound around a reel portion 4a formed at an outer periphery of the rope reel 4 and other end thereof is fixed to the rope reel 4.

A recess portion 4b is formed at a side face of the rope reel 4 opposed to the inner side face of the case 1, and inside of the recess portion 4b is arranged with a recoil mainspring 8 for reeling back the recoil rope 2 extracted from the rope reel 4 to the reel portion 4a of the rope reel 4 by rotating the rope reel 4 rotated in a direction of starting the engine by traction of the recoil rope 2 in a reverse direction. One end side on an inner peripheral side of the recoil mainspring 8 is fixed to the reel support shaft 7 and other end portion on an outer peripheral side thereof is fixed to an inner peripheral face of the recess portion 4b of the rope reel 4, when the rope reel 4 is rotated in the engine starting direction by operating to pull the recoil rope 2, a rotational force is stored in the recoil mainspring 8, the recoil rope 2 extracted to the outer side of the case 1 is operated to reel back by rotating the rope reel 4 in the reverse direction by the rotational force stored to the recoil mainspring 8 by separating or moving back the recoil rope 2.

Figure 3:
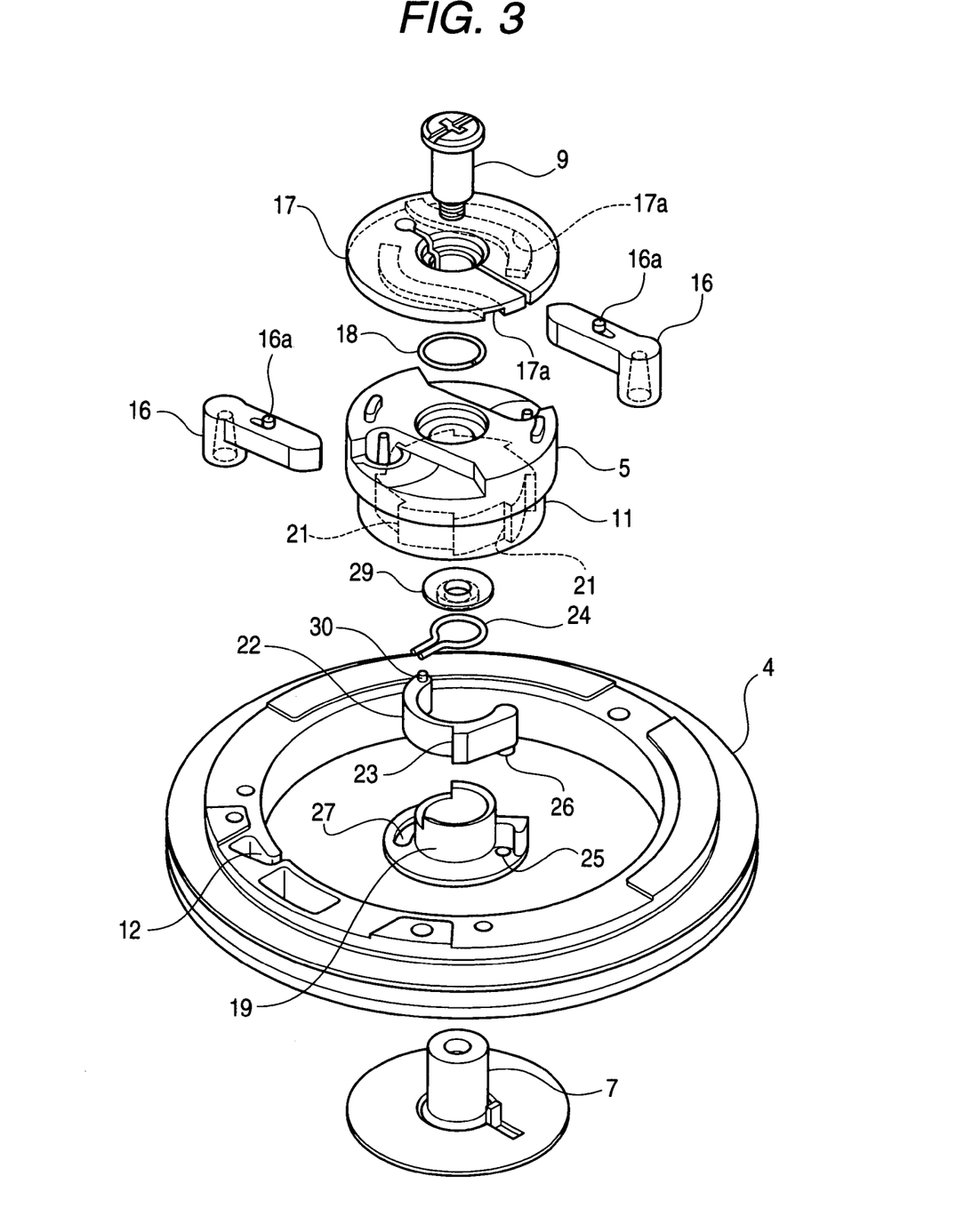
FIG. 3 is a perspective view showing main members constituting the recoil starter the same as that of FIG. 1.

As shown by FIG. 2 and FIG. 3, a side face of the rope reel 4 on a side opposed to the side face formed with the recess portion 4b containing the recoil mainspring 8 of the rope reel 4 is formed with a ring-like recess portion 4c for containing a force storing mainspring 10 as a damping force storing member. Further, a front end of the reel support shaft 7 is rotatably attached with the cam 5 for transmitting rotation of the rope reel 4 for transmitting rotation of the rope reel 4 to the side of the rotating member 6 attached to the crankshaft of the engine by a fixed shaft 9 screwed to a front end face of the reel support shaft 7, a side face of the cam 5 on a right side of FIG. 2 is integrally formed with a boss portion 11 for winding the force storing mainspring 10, and the boss portion 11 is contained at a center portion of the ring-like recess portion 4c of the rope reel 4. One end on an outer peripheral side of the force storing mainspring 10 contained in the ring-like recess portion 4c is locked by a locking portion 13 formed at an outer peripheral face of the boss portion 11 of the cam 5, thereby, the rope reel 4 and the cam 5 are connected by way of the force storing mainspring 10 and rotation of the rope reel 4 is transmitted to the cam 5 by way of the force storing mainspring 10.

A clutch mechanism 14 for transmitting rotation of the cam 5 to the rotating member 6 when the cam 5 is rotated in the engine starting direction is formed between the cam 5 and the rotating member 6 attached to the crankshaft of the engine. The clutch mechanism 14 is constituted by a plurality of engaging teeth 15 formed at equal intervals along a circumferential direction at an inner peripheral face of the rotating member 6 formed in a cup-like shape provided to be opposed to the cam 5, a clutch claw 16 a front end portion which is engageable with the engaging teeth 15 and a base portion side of which is provided to be supported rotatably relative to the cam 5, and a guide plate 17 supported by the reel support shaft 7 in a state of being provided with a predetermined rotational resistance to operate the clutch claw 16 by way of a projection 16a formed at the clutch claw 16.

As shown by FIG. 3, the guide plate 17 is provided with the predetermined rotational resistance relative to the reel support shaft 7 by elastically mounting the guide plate 17 formed with a slit 17a in a diameter direction by including a center opening to the screw shaft 9 by way of a friction ring 18. A guide groove 17a is formed at a lower face side in FIG. 3 of the guide plate 17, the projection 16a of the clutch claw 16 is loosely fitted to inside of the guide groove 17a, when the cam 5 is rotated, the projection 16a of the clutch claw 16 is guided by the guide groove 17a of the guide plate 17, when the cam 5 is rotated in the engine starting direction, the clutch claw 16 is engaged with the engaging teeth 15 of the rotating member 6, and the rotating member 6 is rotated in the engine starting direction integrally with the cam 5. Further, when the cam 5 is rotated in a direction reverse to the engine starting direction, by operating the clutch claw 16 to separate from the engaging teeth 15 of the rotating member 6, rotation in the reverse direction of the cam 5 is prevented from being transmitted to the side of the rotating member 6.

As described above, according to the embodiment, there is formed the clutch mechanism 14 in which the guide groove 17a is formed at the guide plate 17 elastically mounted to the screw shaft 9 fixed to the reel support shaft 7 to provide the predetermined rotational resistance, the projection 16a of the clutch 16 rotatably held by the cam 5 is loosely fitted to inside of the guide groove 17a, and the clutch claw 16 is operated by friction by operating to rotate the cam 5 between the cam 5 and the rotating member 6, thereby, the quiet recoil starter which does not emit sound of interrupting the clutch mechanism or the like can be provided.

Between the rope reel 4 driven to rotate by traction of the recoil rope 2 and the cam 5 for transmitting rotation on the side of the rope reel to the side of the engine by way of the clutch mechanism 14, there is formed a ratchet mechanism 20 operated to separate the both members when the rope reel 4 is rotated in the engine starting direction by traction operation of the recoil rope 2 and operated to rotate the cam 5 in the reverse direction integrally with the rope reel 4 by rotatably connecting the both members when the rope reel 4 is rotated in a direction reverse to the engine starting direction. An inner side of the boss portion of the cam 5 is formed with a recess portion 11a to contain a center boss portion 19 of the rope reel 4 rotatably supported by the reel support shaft 7, and the ratchet mechanism 20 is formed between an outer peripheral face of the center boss portion 19 of the rope reel 4 and an inner peripheral face of the recess portion 11a of the cam 5.

The ratchet mechanism 20 is constituted by a plurality of engaging teeth 21 formed in a rotational direction of starting the engine at the inner peripheral face of the recess portion 11a of the cam 5, a ratchet member 22 formed with a ratchet claw 23 engageable with the engaging teeth 21 and pivotably arranged between the inner peripheral face of the recess portion 11a and the outer peripheral face of the center boss portion 19 of the rope reel 4, and a friction spring 24 for engaging and disengaging the ratchet claw 23 to and from the engaging teeth 21 by pivotably operating the ratchet member 22 in accordance with rotation of the rope reel 4.

Figure 4:
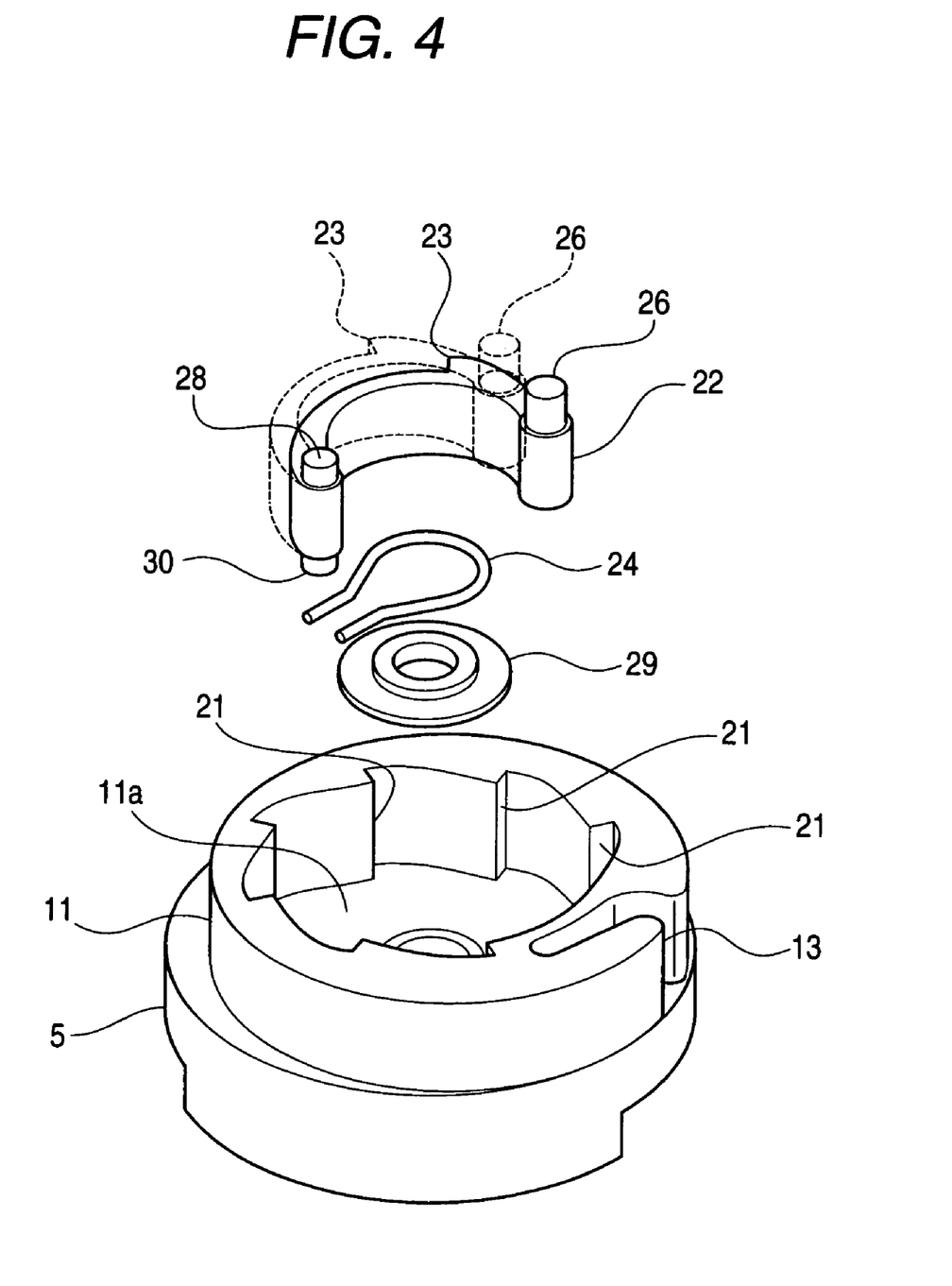
FIG. 4 is a perspective view of main parts constituting a ratchet mechanism of the recoil starter the same as that of FIG. 1 shown from a side face on a side opposed to that of FIG. 3.

The ratchet member 22 is formed in a bent shape to be able to be arranged to surround the center boss portion 19 at a surrounding of the center boss portion 19 of the rope reel 4, one end side of the ratchet member 22 is formed with a support shaft 26 contained in a support hole 25 formed at the rope reel 4, thereby, the ratchet member 22 is rotatably supported centering on the support shaft 26. Further, other end side of the ratchet member 22 is formed with a guide projection 28 loosely fitted to inside of a guide groove 27 formed at the rope reel 4, and by pivoting the other end side of the ratchet member 22 along the guide groove 27, the ratchet member 22 is rotated centering on the support shaft 26 on the one end side and the ratchet claw 23 is operated to be engaged and disengaged to and from the engaging teeth 21.

The friction spring 24 provides a predetermined rotational resistance to the reel support shaft 7 by being elastically mounted to an outer peripheral face of a space pipe 29 fixed to the front end face of the reel support shaft 7 by the fixing shaft 9, and a projected portion 30 formed to be projected on other end side of the ratchet member 22 is engaged between a pair of end portions of the friction spring 24 projected in an outer diameter direction to be pinched therebetween. Thereby, the other end side of the ratchet member 22 is provided with the predetermined resistance relative to rotation of the rope reel 4, when the rope reel 4 is rotated in the rotational direction of starting the engine by traction of the recoil rope 2 and when the rope reel 4 is rotated in a direction of reeling back the recoil rope 2 to the reel portion 4a by the recoil mainspring 8, the ratchet member 22 is constituted to operate to pivot to disengage or engage the ratchet claw 23 from and to the engaging teeth 21.

Figure 5:
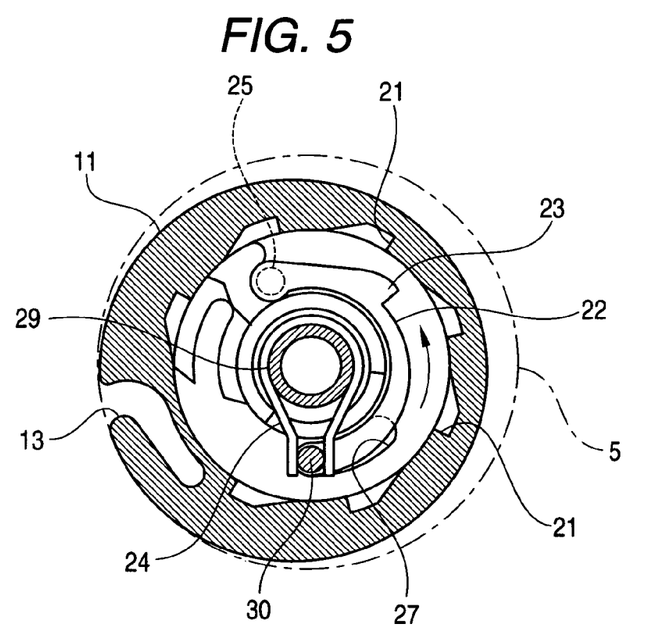
FIG. 5 is a partial sectional view taken along a line A—A of FIG. 2 in a state of rotating a rope reel in an engine starting direction.

Operation of the recoil starter of the embodiment will be explained. When the rope reel 4 is rotated in the engine starting direction by traction operation of the recoil rope 2, the rope reel 4 is rotated in an arrow mark direction of FIG. 5, and in accordance with rotation of the rope reel 4, a side of the support shaft 26 of the ratchet member 22 supported by the support hole 25 of the rope reel 4 is rotated integrally with the rope reel 4 centering on the reel support shaft 7. At this occasion, since the projected portion 30 formed on the other end side of the ratchet member 22 is engaged with the friction spring 24, rotation is hampered by the rotational resistance of the friction spring 24 and as shown by FIG. 5, the ratchet claw 23 is rotated centering on the support shaft 26 to separate from the engaging teeth 21 of the cam 5.

As described above, when the rope reel 4 is rotated in the engine starting direction, a state of connecting the rope reel 4 and the cam 5 by the ratchet mechanism 20 is released, however, since the rope reel 4 and the cam 5 are connected by way of the force storing mainspring 10, by rotating the rope reel 4 in the engine starting direction, the cam 5 is rotated by way of the force storing mainspring 10, and the rotating member 6 is rotated by way of the clutch mechanism 14 formed between the cam 5 and the rotating member 6 to thereby rotate the crankshaft of the engine coupled to the rotating member 6. When a load of rotating the rotating member 6 is increased by a resistance of starting the engine, rotation of the rotating member 6 is hampered and also rotation of the cam 5 is stopped by way of the clutch mechanism 14, however, the rope reel 4 is further rotated by traction of the recoil rope 2, the force storing mainspring 10 is wound and the rotational force of the rope reel 4 is stored in the force storing mainspring 10.

Figure 6:
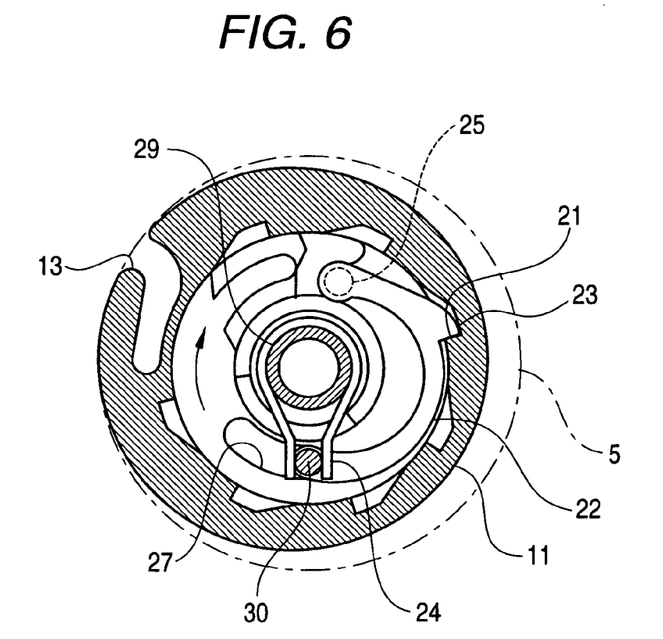
FIG. 6 is a sectional view similar to FIG. 5 in a state of rotating the rope reel to a side opposed to the engine starting direction.

When the recoil rope 2 pulled in a state of storing rotational force by winding the force storing mainspring 10 as described above is relaxed, the rope reel 4 is rotated in a direction reverse to the engine starting direction by the recoil mainspring 8 to reel back the recoil rope 2 to the rope reel 4. By rotating the rope reel 4 in the direction reverse to the engine starting direction, the rope reel 4 is rotated in a narrow mark direction of FIG. 6, in accordance with rotation of the rope reel 4, the side of the support shaft 26 of the ratchet member 22 supported by the support hole 25 of the rope reel 4 is rotated in the arrow mark direction centering on the reel support shaft 7 integrally with the rope reel 4. At this occasion, rotation of the projected portion 30 formed on the other end side of the ratchet member 22 is hampered by the rotational resistance of the friction spring 24 and as shown by FIG. 6, the ratchet claw 23 is rotated centering on the support shaft 26 to be engaged with the engaging teeth 21 of the cam 5.

When the rope reel 4 is rotated in the direction reverse to the engine starting direction as described above, since the rope reel 4 and the cam 5 are connected by the ratchet mechanism 20, the cam 5 is rotated in the direction reverse to the engine starting direction integrally with the rope reel 4 while maintaining the rotational force stored to the force storing mainspring 10. Further, the clutch mechanism 14 formed between the cam 5 and the rotating member 6 separates the cam 5 and the rotating member 6 to enable to rotate the cam 5 in the reverse direction by rotating the cam 5 in the direction reverse to the engine starting direction. Thereby, the recoil rope 2 can be reeled back to the rope reel 4 while maintaining the state of storing the rotational force to the force storing mainspring 10.

When the rope reel 4 is rotated in the engine starting direction by traction of the recoil rope 2 again, the cam 5 is rotated by way of the force storing mainspring 10 in the state of storing the rotational force, the cam 5 is connected to the rotating member 6 by way of the clutch mechanism 14 to rotate the rotating member 6, when rotation of the cam 5 is hampered by transmitting the resistance of starting the engine to the cam 5 again, the side of the projected portion 30 of the ratchet member 22 is operated to guide by the rotational resistance of the friction spring 24 again, the ratchet member 22 is pivoted centering on the support shaft 26 and the ratchet claw 23 and the engaging teeth 21 are released from being engaged with each other, and the rotational force is stored to the force storing mainspring 10 further by rotation of the rope reel 4. When the rotational force stored to the force storing mainspring 10 exceeds the resistance of starting the engine, the rotational force of the rope reel 4 and the rotational force stored to the force storing mainspring 10 are released, the rotational forces are transmitted to the rotating member 6 by way of the cam 5 and the engine is started by rotating the crankshaft in one motion.

Embodiment 2

Figure 7:
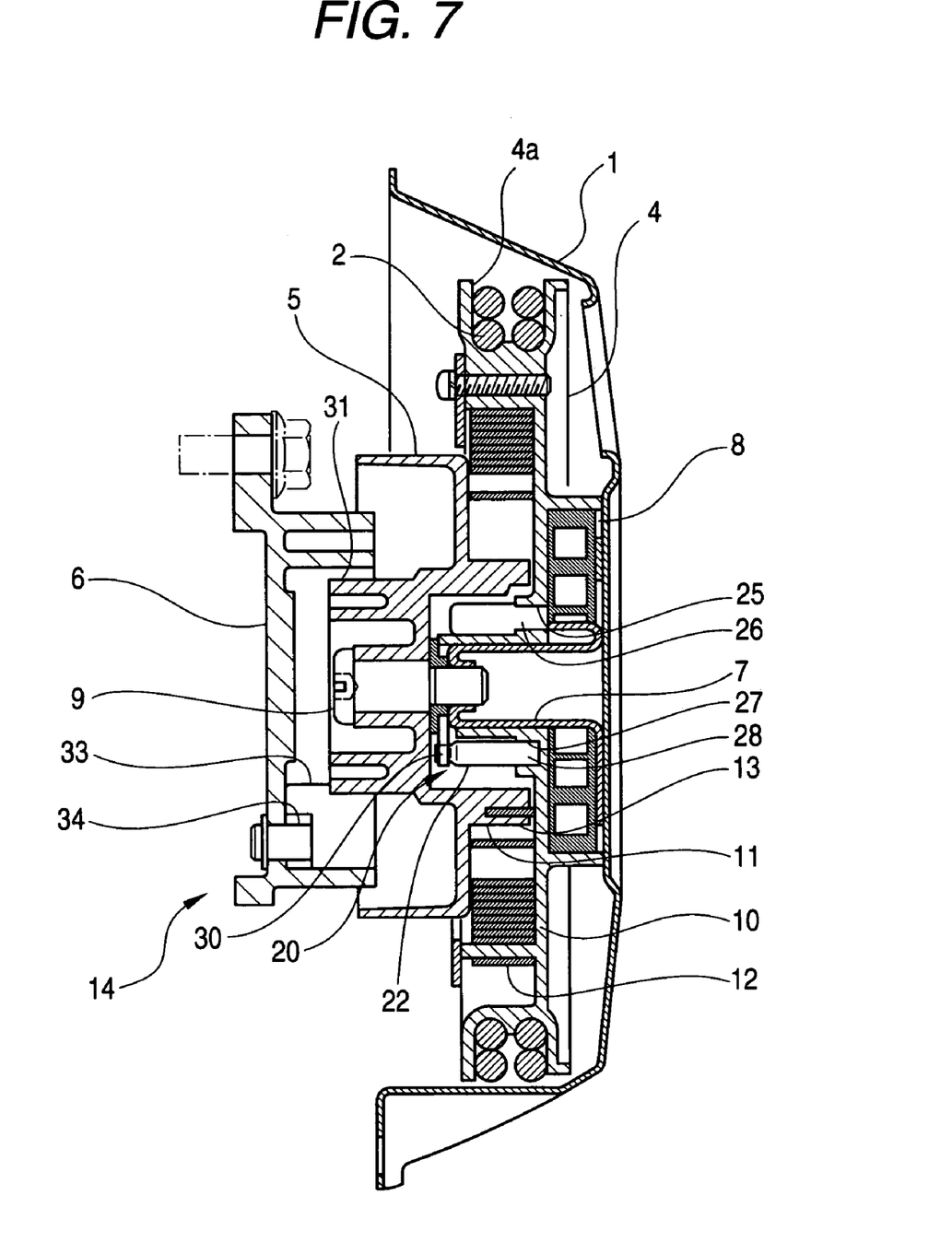
FIG. 7 is a vertical side sectional view of a recoil starter according to other embodiment of the invention.
Figure 8:
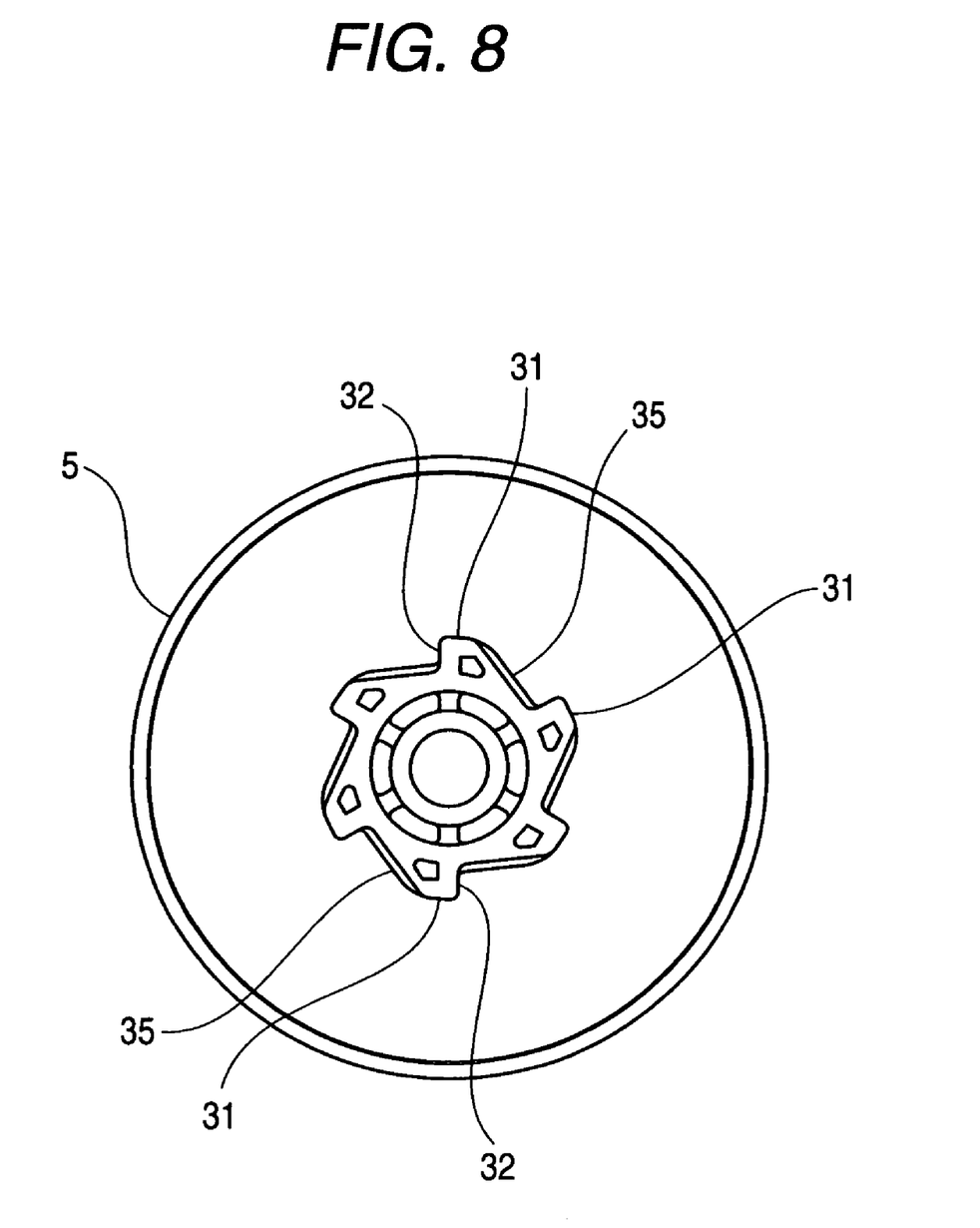
FIG. 8 is a side view showing a cam of the recoil starter of the embodiment the same as that of FIG. 7.

FIG. 7 shows other embodiment of the invention, similar to the above-described embodiment, the ratchet mechanism 20 is formed between the rope reel 4 and the cam 5, thereby, when the rope reel 4 is rotated in the engine starting direction, the both members are separated, the rotational force is stored to the damping force storing member 10, when the rope reel 4 is rotated in the direction reverse to the engine starting direction, the both members are rotatably connected, and the cam 5 is rotated in the reverse direction integrally with the rope reel 4 while maintaining the rotational force stored to the damping force storing member 10. Further, according to the recoil starter of the embodiment, the clutch mechanism 14 for transmitting rotation of the cam 5 to the rotating member 6 or cutting rotation is constituted as a centrifugal clutch mechanism operated by a centrifugal force generated by rotating the rotating member 6. According to the cam 5 by the embodiment, as shown by FIG. 8, there are formed a plurality of cam claws 31 forming engaging faces 32 directed in the rotational direction for starting the engine at the outer peripheral face of the cam 5 to be projected in an outer diameter direction at intervals in a circumferential direction, further, as shown by FIG. 7, the rotating member 6 attached to the crankshaft of the engine is provided with a clutch member 33 normally urged to be engaged with the cam claw 31 of the cam 5 and rotated in a state of being separated from the cam claw 31 by the centrifugal force when the rotating member 6 is rotated by the engine.

The clutch member 33 is urged to pivot to be engaged with the cam claw 31 formed at the cam 5 by a spring 34, when the cam 5 is rotated in the engine starting direction, the clutch member 33 is engaged with the engaging face 32 of the cam claw 31 and the rotating member 6 is rotated in the engine starting direction by way of the clutch member 33. When the rotating member 6 is rotated by way of the crankshaft by starting the engine, the clutch member 33 is pivoted against an urge force of the spring 34 by the centrifugal force and is separated from the cam claw 31 to thereby prevent rotation from the side of the engine from being transmitted to the side of the cam. Further, when the cam 5 is rotated in a direction reverse to the engine starting direction integrally with the rope reel 4 by way of the ratchet mechanism 20 formed between the rope reel 4 and the cam 5, the clutch member 33 is engaged with an inclined face 35 formed on a side of the cam claw 31 opposed to the engaging face 32 and pivoted to an outer peripheral side against the urge force of the spring 34 and therefore, the cam 5 is permitted to rotate in the direction reverse to the engine starting direction. The other constitution is the same as that of the above-described embodiment.

In the recoil starter of either of the embodiments, by pulling the recoil rope 2 by a comparatively long length, by damping force storing operation of the force storing mainspring 10, impact from the side of the engine is not transmitted to the side of the recoil rope 2, the engine can be started easily, further, even by traction operation by a plurality of times by shortening the length of pulling the recoil rope 2, the rotational force of the rope reel 4 can gradually be stored to the force storing mainspring 10, a stroke position and a length of traction of the recoil rope 2 can arbitrarily be adjusted, impact from the side of the engine can be absorbed by damping operation, and the engine can easily be started by the rotational force stored to the force storing mainspring 10.

What is claimed is:

1. A recoil starter comprising:

a rope reel rotatably held by a reel support shaft formed in a case and rotated in an engine starting direction by traction of a recoil rope one end of which is extracted to outside of the case;

a recoil mainspring for urging to rotate the rope reel in a direction reverse to the engine starting direction, a cam for transmitting a rotational force to a rotating member attached to a side of an engine by way of a clutch mechanism; and a damping force storing member interposed between the rope reel and the cam for storing the rotational force of the rope reel and rotating the cam by the stored rotational force when the rope reel is rotated in the engine starting direction for transmitting rotation of the cam rotated by the rotational force stored to the damping force storing member to the rotating member by way of the clutch mechanism, wherein a ring-like recess portion for containing the damping force storing member is formed at a side face of the rope reel, a boss portion of the cam is contained in the ring-like recess portion and the damping force storing member is contained between an inner peripheral face of the ring-like recess portion and an outer peripheral face of the boss portion of the cam, further, an inner side of the boss portion of the cam is formed with a ratchet mechanism for engaging and disengaging the cam to and from the rope reel, when the rope reel is rotated by traction of the recoil rope, the both members are disengaged from each other and when the rope reel is rotated in a direction of reeling back the recoil rope, the both members are engaged to each other by the ratchet mechanism.

2. The recoil starter according to claim 1, wherein the clutch mechanism formed between the rotating member and the cam is provided with a clutch claw engageable with engaging teeth formed at the rotating member to be rotatably supported by the cam, and by engaging the clutch claw with a guide groove formed at a guide plate provided with a predetermined rotational resistance, the clutch claw is constituted to operate to engage and disengage to and from the engaging teeth by operating to rotate the cam.

3. The recoil starter according to claim 1, wherein the clutch mechanism formed between the rotating member and the cam is constituted by a clutch member formed at the rotating member operated to be separated from a cam claw formed at an outer peripheral face of the cam by a centrifugal force of the rotating member.

* * * * *